United States Patent [19]

Grube et al.

[11] Patent Number: 5,583,869
[45] Date of Patent: Dec. 10, 1996

[54] METHOD FOR DYNAMICALLY ALLOCATING WIRELESS COMMUNICATION RESOURCES

[75] Inventors: Gary W. Grube, Palatine; Brian K. Bunkenburg, Chicago; Marc C. Naddell, Schaumburg, all of Ill.

[73] Assignee: Motorola, Inc., Schaumburg, Ill.

[21] Appl. No.: 316,011

[22] Filed: Sep. 30, 1994

[51] Int. Cl.⁶ ........................................... H04J 3/16
[52] U.S. Cl. ........................... 370/347; 379/58; 455/34.1
[58] Field of Search .................................. 370/95.1, 95.3, 370/17, 79, 85.7, 13, 104.1, 58.2; 379/58; 455/34.1, 54.1, 17, 33.2

[56] References Cited

U.S. PATENT DOCUMENTS

| | | |
|---|---|---|
| 4,754,450 | 6/1988 | Lynk, Jr. et al. |
| 5,034,993 | 7/1991 | Sasuta et al. ............................. 455/11 |
| 5,367,524 | 11/1994 | Rideout, Jr. et al. ................ 370/104.1 |
| 5,371,780 | 12/1994 | Amitay ..................................... 379/58 |
| 5,381,403 | 1/1995 | Maher et al. ............................. 370/13 |
| 5,442,809 | 8/1995 | Diaz et al. ............................. 455/54.1 |

Primary Examiner—Wellington Chin
Assistant Examiner—Melissa Kay Carman
Attorney, Agent, or Firm—Christopher P. Moreno

[57] ABSTRACT

In a TDM wireless communication system (100), a central controller (104) monitors the transfer of a message (108) in order to determine a system grade of service. Based on the system grade of service, the central controller dynamically allocates a lesser or greater number of wireless communication resources (105). Alternatively, a communication unit (101) can directly request additional wireless communication resources.

24 Claims, 5 Drawing Sheets

METHOD FOR DYNAMICALLY ALLOCATING WIRELESS COMMUNICATION RESOURCES

FIELD OF THE INVENTION

The present invention relates generally to time division multiplexed (TDM) wireless communication systems and, in particular, to a method for dynamic allocation of wireless communication resources within TDM wireless communication systems.

BACKGROUND OF THE INVENTION

Within TDM wireless communication systems, the transmission of voice messages is well known. In such systems, communication units (i.e., hand-held or in-car mobile radios) are assigned wireless communication resources in the form of radio frequency (RF) carrier divided by time into multiple time slots. Typically, these wireless communication resources (i.e., time slots) have relatively low bandwidths. In the present context, the term bandwidth is used to generally refer to the throughput rate at which a particular communication medium can be used to transmit information. These low-bandwidth wireless communication resources have been acceptable because voice messages typically do not require a high transmission rate to be transmitted in a timely manner, i.e., with a minimal amount of delay. Additionally, because the time needed to complete a typical voice message is generally small, it is a feature of many TDM wireless communication systems that the wireless communication resource used for a voice message is dedicated for the duration of the transmission.

Among users of TDM wireless communication systems, the need for transmission of non-voice messages, such as text and image files, often collectively referred to as data messages, is growing. Voice messages and data messages may be particularly distinguished by the relative amounts of bandwidth required to transmit them. That is, many data messages require high-throughput communication resources in order to be transmitted with minimal delay. When data messages are transmitted via low-throughput wireless communication resources, originally intended for voice messages, completion of the message transmission is often delayed. These difficulties notwithstanding, it would be useful to allow the bandwidth (i.e., throughput) of a particular transmission to be dynamically altered as needed and to allow voice and data messages to be simultaneously transmitted.

An example may best illustrates why current TDM wireless communication systems are not well suited to the proposed services described above. Consider an ambulance transporting a patient to a hospital emergency room. To provide voice communications between the ambulance and the hospital, a TDM wireless communication system allocates a wireless communication resource (i.e., time slot) in order to transmit the voice information. During the transmission of the voice information, it may be necessary to transmit a medical image of the patient's injuries to the hospital.

Using current TDM systems, the data message (medical image) must either be multiplexed with the voice message on the same wireless communication resource, or it must interrupt the voice message altogether. If multiplexed, both the voice message and the data message may be prohibitively delayed. If the voice message is interrupted, critical information between ambulance and hospital personnel may be missed.

One solution is to provide wireless communication resources having higher throughput rates. Technological advances such as linear amplifiers and improved modulation schemes may provide needed improvements, but such innovations are often expensive to develop and increase the complexity of the systems involved.

Another solution is to use multiple communication devices (e.g., dedicated radios) thereby eliminating the need for multiplexing and/or interruption. Such a solution, however, is cost prohibitive.

Yet another solution is to provide enough communication resources for each service request such that all potential throughput needs are met. Using the previous ambulance example, this would require that enough wireless communication resources be allocated at the time the voice message is begun so that additional messages, e.g., the medical image, may also be transmitted at any time during transmission of the voice message. While this solution alleviates the difficulties of excessive delay and, possibly, interruptions, it goes too far in that it assigns resources that could be put to immediate use for other users, thereby creating overall system inefficiencies.

Thus, it is shown that a shortcoming of prior art TDM wireless communication systems is the inability to dynamically allocate communication resources on an as-needed basis. Therefore, a need currently exists for a method wherein wireless communication resources may be dynamically allocated in response to changing service requirements or system capabilities.

DESCRIPTION OF A PREFERRED EMBODIMENT

Generally, the present invention provides a method for the dynamic allocation of wireless communication resources within a TDM wireless communication system. A communication unit within the TDM wireless communication system requests, from a central controller, the usage of a first number of wireless communication resources. When the first number of wireless communication resources are available, they are allocated by the central controller to the communication unit, thereby allowing the communication unit to transmit portions of a message via the first number of wireless communication resources. Concurrently, the central controller monitors transmission of the portions of the message to determine a system grade of service. Based on the system grade of service, a second number of wireless communication resources can be allocated to the communication unit.

In an alternate embodiment, the central controller can allocate the second number of communication resources in response to a request from the communication unit. In this manner, wireless communication resources may be dynamically allocated within the TDM wireless communication system as necessitated by changing service requirements or system capabilities.

Figure 1:
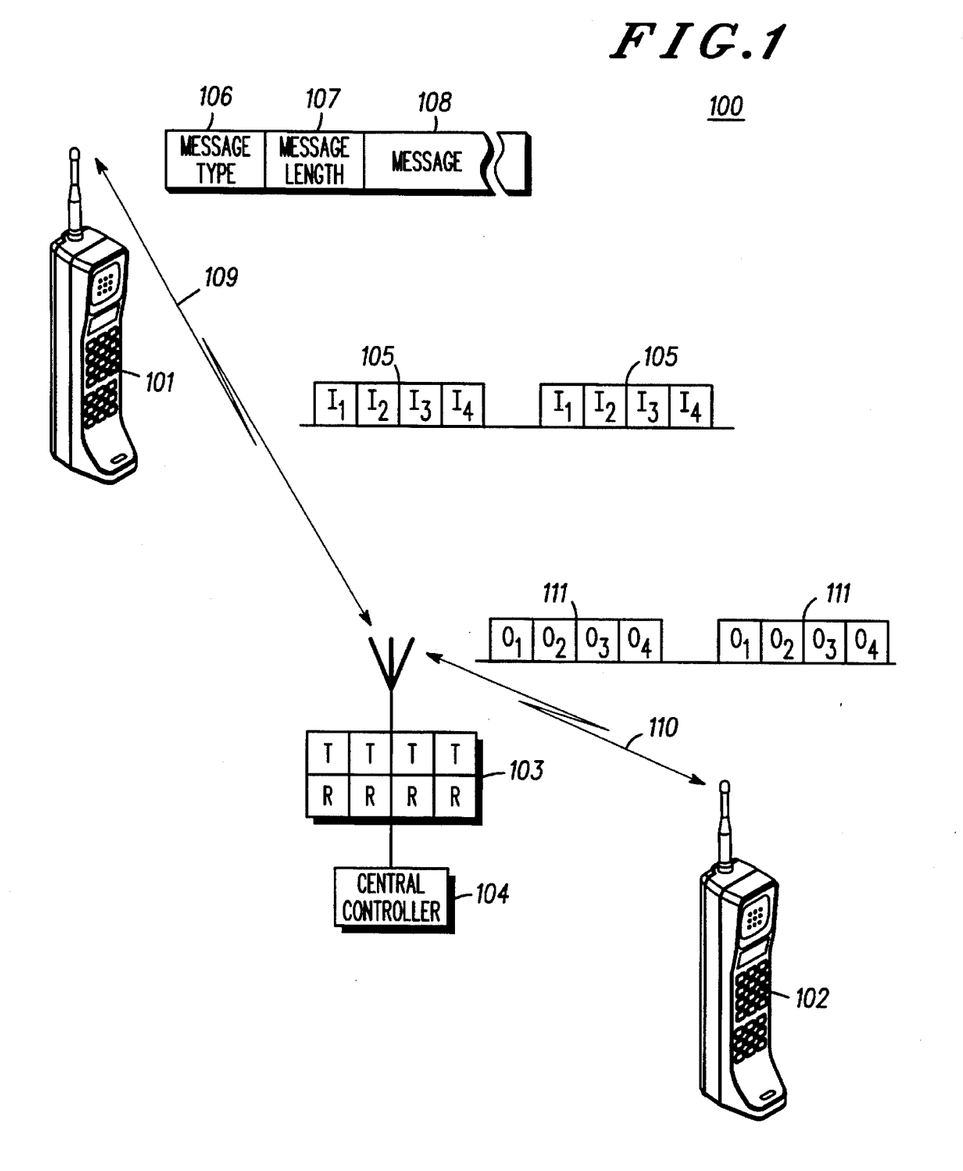
FIG. 1 illustrates a TDM wireless communication system in accordance with the present invention.

The present invention can be more fully described with reference to FIGS. 1–5. FIG. 1 illustrates a TDM wireless communication system 100 that includes a plurality of communication units 101–102 and a plurality of base stations 103. The communication units 101–102, which can be MIRS™ portable radios by Motorola, Inc., provide voice and/or data messages 108 in the form of compressed digital audio and compressed data transfers, respectively. Additionally, the communication units 101–102 are modified to transmit multiple messages simultaneously, using TDM techniques, if necessary.

The base stations 103, which may comprise MIRS™ base station radios by Motorola, Inc., transceive RF carriers 109–110 that are allocated among the communication units 101–102 by a central controller 104. The central controller 104, which can be a MIRS™ Dispatch Application Controller (DAP) by Motorola, Inc., provides the allocation control of a plurality of wireless communication resources 105,111 in response to requests from the communication units 101–102.

In a preferred embodiment, hereinafter assumed, the wireless communication resources 105,111 comprise time slots on the RF carriers 109–110. The wireless communication resources 105, 111 are separated into four inbound wireless communication resources $I_1$–$I_4$ and four outbound wireless communication resources $O_1$–$O_4$. The number of time slots (i.e., wireless communication resources) is a design choice; others numbers are possible. The inbound wireless communication resources $I_1$–$I_4$ are used for communications from the communication units 101–102 to the base stations 103 and central controller 104. The outbound wireless communication resources $O_1$–$O_4$ are used for communications from the base stations 103 and central controller 104 to the communication units 101–102. The wireless communication resources 105,111 are generally used to communicate control information, such as call requests and call assignments as well as message information, such as compressed digital voice or data. It is also possible to combine both control information and message information into a single time slot by allocating the proper number of bits for each, as is well known in the art.

In a preferred embodiment, the communication units 101–102 are capable of receiving or transmitting on multiple wireless communication resources 105,111. This allows the central controller 104 to allocate one or more time slots to a communication unit 101–102 to match the needs of the communication unit with the resource availability, later described in detail.

The voice and/or data message 108 is appended to a header containing a message type 106 and a message length 107. In numerous prior art data communication systems, message length fields typically specify the exact number of data bytes of a subsequent message. In contrast, the message length 107 is an estimate of the length of the message 108, generally in terms of eight-bit bytes, because the present invention allows the message length to change during transmission of the message.

Similarly, the message type 106 is an initial estimate for the type of information contained in the message 108. Several codes can be assigned to a set of pre-determined data types that are important to the field of application. For example, in the medical arena, codes would be assigned for heart beat telemetry, vital signs, X-rays, and even visual images of varying resolutions. In addition to transmission at the beginning of the message 108, the message type 106 and message length 107 are periodically interleaved with the transmitted message 108. Thus, if it becomes necessary to alter the type and/or length of message being transmitted, that information can be conveyed quickly to the rest of the system 100.

Figure 2:
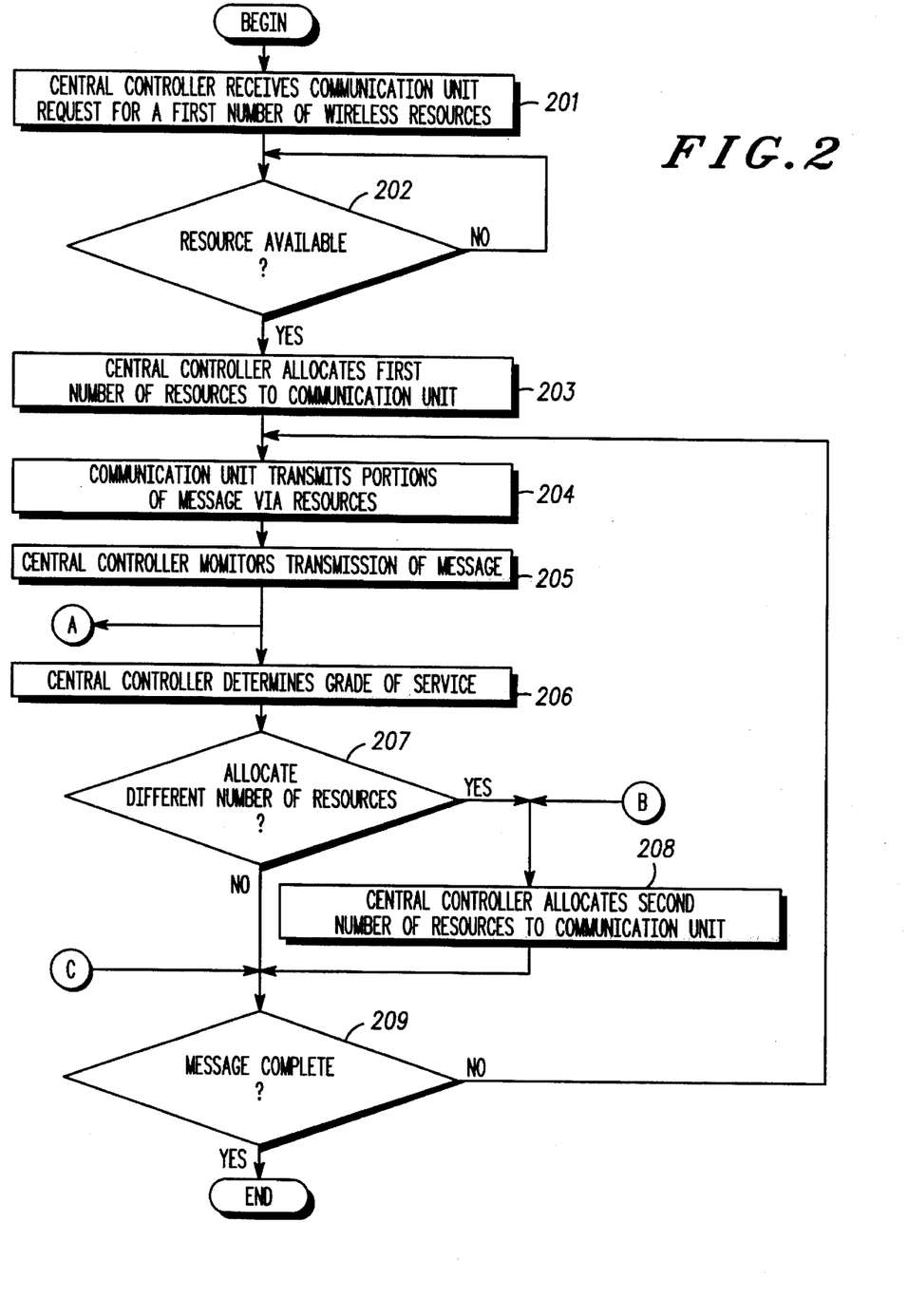
FIG. 2 illustrates a method for the dynamic allocation of wireless communication resources based on a system grade of service for a message.

FIG. 2 illustrates a method for the dynamic allocation of wireless communication resources based on a system grade of service for a message. At step 201, a communication unit 101 requests, via a control channel, a first number of wireless communication resources from the central controller 104. The communication unit 101 can determine the first number of wireless communication resources based on the message type. Typically, small file transfers or voice will require only one wireless communication resource. Larger files, or files that should be transferred more quickly, generally require more wireless communication resources. For example, a medical image may require two or more time slots so that it can be transferred within a desired time threshold.

At step 202, the central controller 104 determines that the first number of wireless communication resources are available. Typically, this is achieved through the use of a table of allocated and available wireless communication resources maintained by the central controller 104. Once the first number of wireless communication resources is available 202, the central controller 104 allocates them 203 to the communication unit 101 and to a target audience, such as another communication unit 102. For example, time slots $I_2$ and $O_2$ of the wireless communication resources 105,111, when not in use, can be allocated to the communication unit 101.

When the first number of wireless communication resources have been allocated 203, the communication unit 101 transmits portions of the message via the first number of wireless communication resources 204. To this end, the message is parsed into portions suitable for transmission via the allocated time slots.

Again using the ambulance example and assuming that time slots $I_2$ and $O_2$ of the wireless communication resources 105,111 have been allocated, the communication unit 101 can transmit, for instance, vital signs (i.e., heart beat rate, blood pressure, etc.) within the message field 108. As the message 108 proceeds, it is parsed into portions small enough to be transmitted within successive occurrences of time slots $I_2$ and $O_2$. Preceding the actual message, a vital sign message type 106 and a byte count for the vital signs 107 are also transmitted via time slots $I_2$ and $O_2$. As is well known in the art of TDM systems, the transmitted portions of the message may be received and retransmitted by the base stations 103 (repeater operation, time slots $I_2$ and $O_2$ used), or the transmitted portions of the message may be received directly by the target audience 102 (talkaround operation, time slot $I_2$ used).

Concurrent with the transmission of the message 108 by the communication unit 101, the central controller 104 monitors 205 the transmission of the message 108. Because the central controller 104 controls allocation of the wireless communication resources 105, 111, via communications with the base stations 103, the central controller 104 can not only monitor the transmission of the message 108 from the communication unit 101, but from a plurality of other communication units that are also assigned resources.

As a result of the monitoring 205, the central controller 104 determines a system grade of service 206 for the transmitted portions of the message 108. As discussed in greater detail below, the system grade of service can be based on one or more metrics, including the predicted completion time for a message and an average message delay profile.

Based on the system grade of service, the central controller 104 determines if a different number of resources should be allocated 207. If the central controller 104 determines that a different number of resources should be allocated, it will allocate 208 a second number of wireless communication resources to the communication unit 101. The determination of whether the second number of wireless communication resources is greater or less than the first number of wireless communication resources is discussed in greater detail below.

Whether a second number of wireless communication resources have been allocated 208 or not, the central controller 104 determines if the message 108 has ended. If transmission of the message has ended 209, the central controller 104 de-allocates the wireless communication resources, as is well known in the art. If the message is not yet completed 209, processing continues as described above at step 204.

Figure 3:
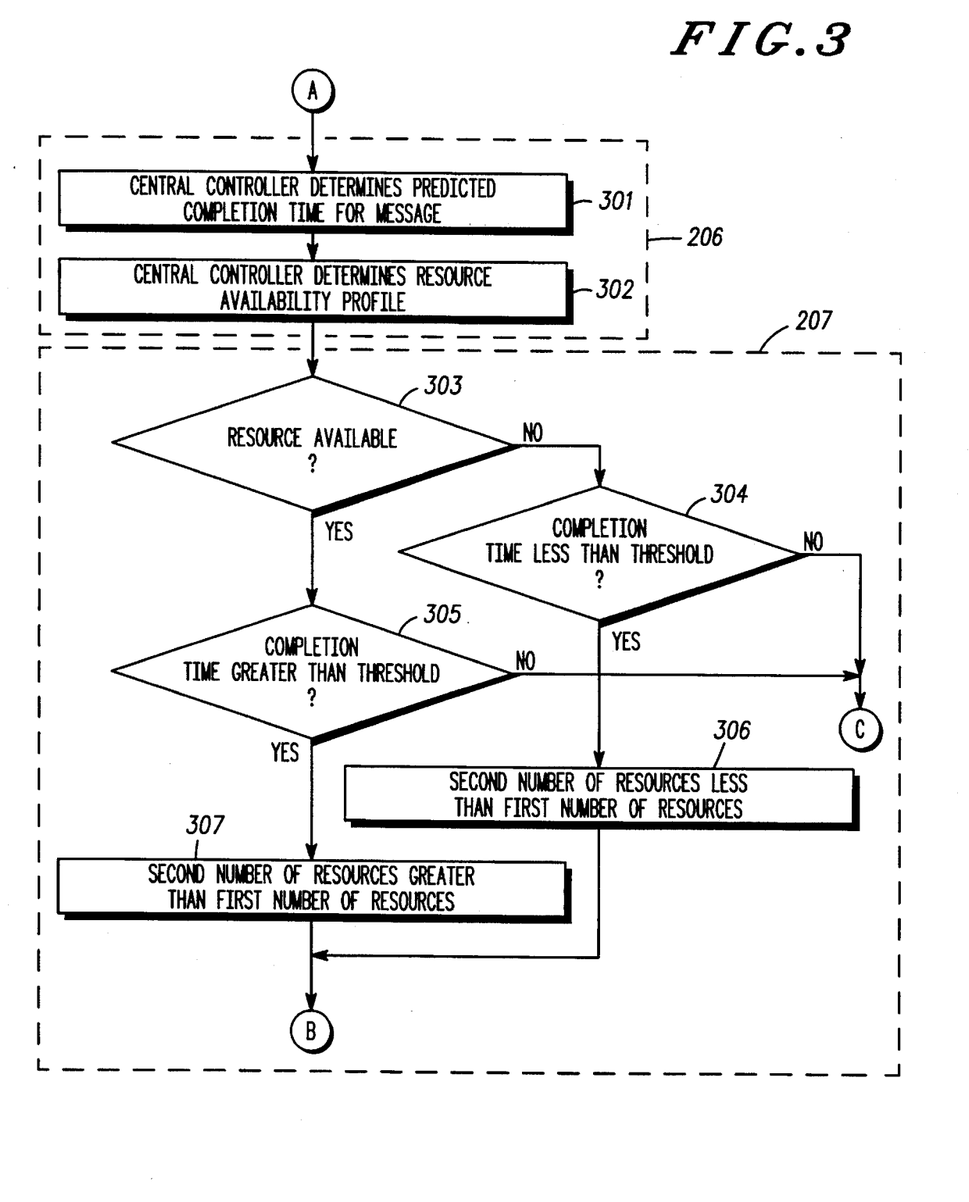
FIG. 3 illustrates a first embodiment of a method that may be used by a central controller to determine a system grade of service for a message and to decide when to allocate a different number of wireless communication resources.
Figure 4:
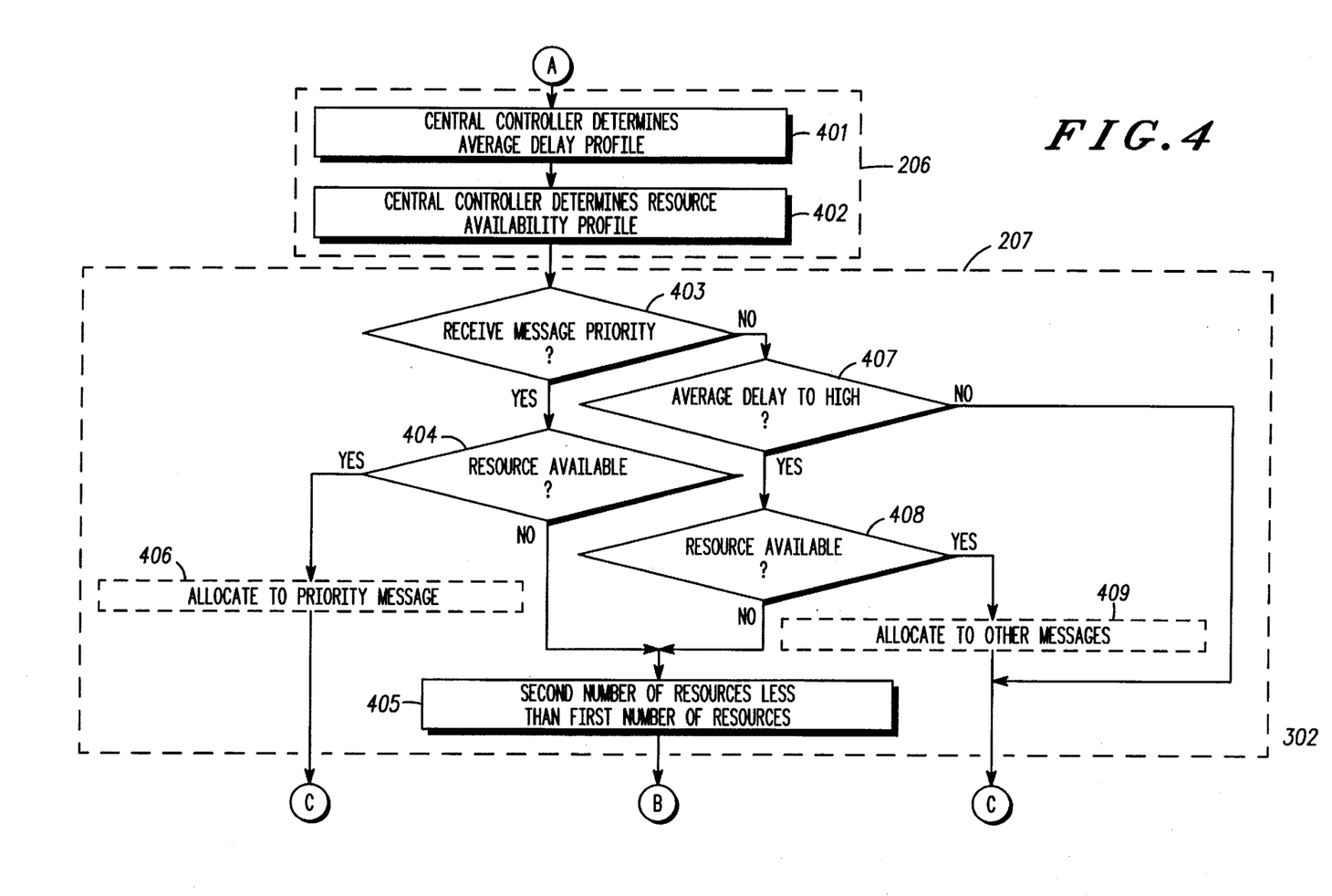
FIG. 4 illustrates a second embodiment of a method that may be used by a central controller to determine a system grade of service for a message and to decide when to allocate a different number of wireless communication resources.

By determining the system grade of service for the transmitted portions of the message, the present invention allows the number of wireless communication resources allocated for transmission of the message to be dynamically allocated, even during transmission of the message. FIGS. 3 and 4 further describe the determination of a system grade of service and the decision regarding when to allocated a different number of wireless communication resources.

FIG. 3 illustrates a first embodiment of a method that may be used by a central controller to determine a system grade of service for a message (i.e., step 206) and to decide when to allocate a different number of wireless communication resources (i.e., step 207). In order to determine a system grade of service, the central controller 104 determines a predicted completion time for the message 301. Generally, this is based on the initial message length estimate 107. As a result of the monitoring at step 205, the number of bytes already sent is known, and thus an estimate of the number of untransmitted bytes can be calculated. The central controller 104 calculates the predicted completion time by dividing the estimate of the number of untransmitted bytes by the current transfer rate of the first number of wireless communication resources. If a change in message type 106 or message length 107 should occur at any point, the predicted completion time can be recalculated as necessary.

Using the aforementioned table of allocated and available wireless communication resources, the central controller 104 determines a resource availability profile 302. If the resource availability profile indicates that wireless communication resources are available 303, then the predicted completion time is compared against a first predetermined threshold 305. The first predetermined threshold is based on the message type 106 and reflects an average time in which messages of that type may be expected to be completed. For example, if the message is an x-ray image file, the first predetermined threshold could be set at 300 seconds. If the predicted completion time is not greater than the first predetermined threshold 305, it is assumed that the transfer rate of the message 108 is sufficient, and no additional resources need be allocated. Additionally, the number of wireless communication resources allocated to the message 108 does not need to be reduced because it has already been determined 303 that other wireless communication resources are available for other callers.

If, however, the predicted completion time is greater than the first predetermined threshold 305, a second number of wireless communication resources, greater than the first number of wireless communication resources, are allocated 307. This occurs when the transfer rate, as reflected by the predicted completion time, is too slow. By allocating a greater number of resources, the transfer rate is increased. For example, assuming that only time slots $I_2$ and $O_2$ of the wireless communication resources 105,111 had been originally allocated to the communication unit 101, and that the resulting transfer rate was too slow, the central controller 104 can allocate time slots $I_1$, $I_2$, $O_1$ and $O_2$ to the communication unit 101, thereby increasing the transfer rate.

If, at step 303, wireless communication resources are not available, the central controller 104 may attempt to reduce the number of wireless communication resources allocated to the communication unit 101. To this end, the predicted completion time is compared against the first predetermined threshold. If the predicted completion time is not less than the first predetermined threshold 304, it is assumed that the transfer rate of the message 108 is already insufficient, and that the allocated resources should not be reduced.

If, however, the predicted completion time is less than the first predetermined threshold 304, a second number of wireless communication resources, less than the first number of wireless communication resources, are allocated 306. This occurs when the transfer rate, as reflected by the predicted completion time, is higher than necessary. By allocating a lesser number of resources, the transfer rate is decreased. For example, assuming that time slots $I_1$, $I_2$, $O_1$ and $O_2$ of the wireless communication resources 105,111 had been originally allocated to the communication unit 101, and that the resulting transfer rate is more than sufficient, the central controller 104 can allocate only time slots $I_2$ and $O_2$ to the communication unit 101, thereby decreasing the transfer rate. The now-available time slots $I_1$ and $O_1$ can then be allocated for other uses in the system 100.

FIG. 4 illustrates a second embodiment of a method that may be used by a central controller to determine a system grade of service for a message (i.e., step 206) and to decide when to allocate a different number of wireless communication resources (i.e., step 207). At step 401 the central controller 104 determines an average message delay profile. In the context of the present invention, the average message delay profile comprises running averages of the transmission delays encountered for each message type. For example, if four x-ray image files have been recently transmitted within the system 101 by the plurality of communication units 101–102, and the central controller 104, while monitoring each of these transmissions, determines their delays to be 3.5, 2.0, 4.0, and 1.5 seconds, respectively, the average message delay for x-ray images would be 2.75 seconds. Similar calculations are made for each message type, thereby creating the average message delay profile. As in step 302 above, the central controller 104 uses the table of allocated and available wireless communication resources to determine a resource availability profile 402.

Before proceeding further, the central controller 104 determines if a priority message indication has been received 403. A priority message indication could be received, for instance, when information regarding a medical emergency is transmitted. The priority message indication, when received, alerts the central controller 104 that the ensuing message should have priority with regard to the allocation of wireless communication resources.

If a priority message indication is received 403, it is determined if wireless communication resources are available 404 based on the resource availability profile. If resources are available 404, the central controller can optionally choose to allocate additional resources for use with the priority message 406.

If, however, resources are not available 404, then wireless communication resources currently used for other nonpriority messages are deallocated, regardless of the transfer rate of those messages. To this end, the second number of wireless communication resources is less than the first number of wireless communication resources 405, thereby making resources available. The now-available resources are then allocated to the priority message (not shown).

When a priority message indication is not received 403, the average message delay for the current message type 106 is compared against a second predetermined threshold 407. The second predetermined threshold is based on the message type 106 and reflects an average transmission delay time for messages of that type. For example, if the message is an x-ray image file, the second predetermined threshold could be set at 1 second. If the average message delay is not greater than the second predetermined threshold 407, the process continues at step 209.

If the average message delay is greater than the second predetermined threshold 407, resource availability is again determined 408. If resources are available 408, they are optionally allocated 409 to this type of message, including the current message 108. Future transmissions of this type of message are given priority to the available resource, thereby decreasing future transmission delays. If resources are not available 404, then wireless communication resources currently used for other messages are deallocated, regardless of the transfer rate of those messages. Thus, processing continues at step 405 as discussed above.

Using the methods described in FIGS. 2–4, the present invention makes it possible to dynamically allocate wireless communication resources based on a system grade of service determined by the central controller. In another embodiment of the present invention, it is possible for a communication unit to directly request additional wireless communication resources.

Figure 5:
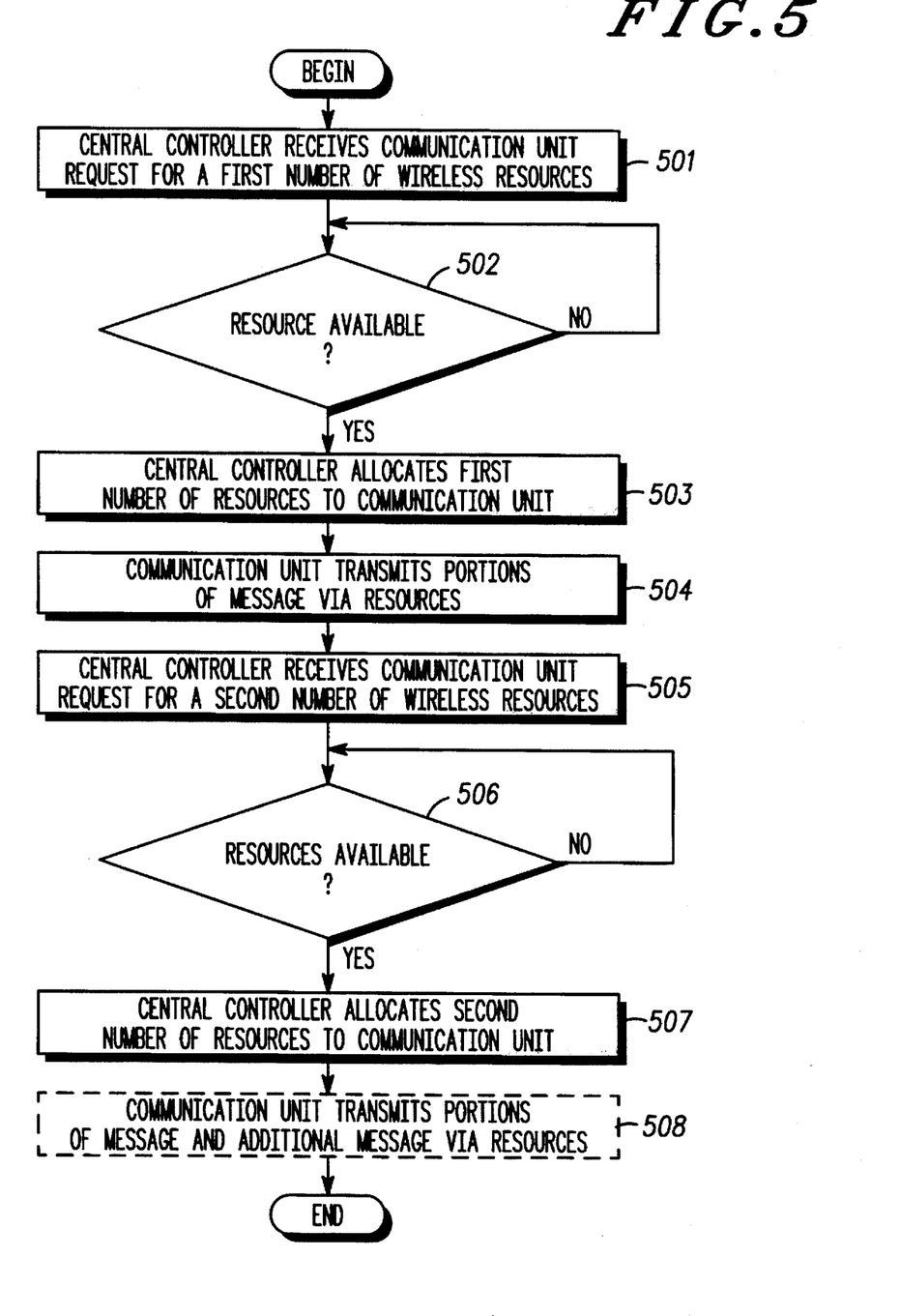
FIG. 5 illustrates a method for the dynamic allocation of communication resources based on requests from a communication unit.

FIG. 5 illustrates a method for the dynamic allocation of communication resources based on requests from a communication unit. At step 501, a communication unit 101 requests a first number of wireless communication resources from the central controller 104. As described above, the communication unit 101 can determine the first number of wireless communication resources based on the message type.

At step 502, the central controller 104 determines that the first number of wireless communication resources are available. When the first number of wireless communication resources is available 502, the central controller 104 allocates them 503 to the communication unit 101 and to a target audience.

Once the first number of wireless communication resources have been allocated 503, the communication unit 101 transmits portions of the message 108 via the first number of wireless communication resources 504; the message 108 is parsed into portions suitable for transmission via the allocated time slots.

During transmission of the message, the communication unit 101 can request from the central controller 104, via a control channel (i.e., time slot), a second number of wireless communication resources 505. This may occur if a user of the communication unit 101 wished to transmit an additional message simultaneously with the current message, for instance. Regardless of the reason for requesting the second number of wireless communication resources, the central controller once again determines if the necessary resources are available 506.

When available, the second number of wireless communication resources are allocated 507 to the communication unit 101. Once allocated, the second number of wireless communication resources can be used to transmit the additional message, as well as continue transmitting the current message 508. For example, if the communication unit 101, currently allocated time slots $I_2$ and $O_2$ of the wireless communication resources 105,111, requests another time slot, the central controller 104 can additionally allocate time slots $I_1$ and $O_1$, assuming availability. Thus, the communication unit can use time slots $I_2$ and $O_2$ for transmission of the current message and time slots $I_1$ and $O_1$ for transmission of the additional message. Using this method, the present invention allows a communication unit to request, and thereby indirectly control, the dynamic allocation of wireless communication resources.

The present invention provides a method for the dynamic allocation of communication resources within a TDM wireless communication system. With such a method, the problems caused by changing service requirements or system capabilities are substantially eliminated. To this end, a central controller monitors the transfer of a message within the system in order to determine a system grade of service. Based on this system grade of service, the central controller can dynamically allocate a lesser or greater number of wireless communication resources. Special consideration is given to priority data transfers, such as emergency medical image files, such that other traffic may continue, although at a slower rate, in favor of speeding up the transfer of the priority messages. Alternatively, communication units can directly request additional communication resources. In this manner, the overall efficiency of resource usage and message delivery within the system is improved.

We claim:

1. In a TDM wireless communication system that includes a plurality of communication units, a plurality of wireless communication resources, and a central controller that allocates the plurality of wireless communication resources among the plurality of communication units, a method for dynamically allocating the plurality of wireless communication resources, the method comprising the steps of:

a) requesting, by a communication unit of the plurality of communication units, a first number of wireless communication resources of the plurality of wireless communication resources for transmission of a message;

b) when the first number of wireless communication resources are available, allocating, by the central controller, the first number of wireless communication resources to the communication unit;

c) responsive to allocation of the first number of wireless communication resources, transmitting, by the communication unit, portions of the message via the first number of wireless communication resources;

d) monitoring, by the central controller, transmission of the portions of the message to determine a system grade of service; and e) allocating, by the central controller, a second number of wireless communication resources to the communication unit based on the system grade of service.

2. The method of claim 1, step (b) further comprising the step of allocating the first number of wireless communication resources, wherein the first number of wireless communication resources comprise a first number of time slots on a radio frequency carrier.

3. The method of claim 2, step (e) further comprising the step of allocating the second number of wireless communication resources, wherein the second number of wireless communication resources comprise a second number of time slots on the radio frequency carrier.

4. The method of claim 1, step (d) further comprising the step of monitoring transmission of the portions of the message to determine the system grade of service, wherein the system grade of service is based, at least in part, on a predicted completion time for the message.

5. The method of claim 4, step (d) further comprising the step of monitoring transmission of the portions of the message to determine the system grade of service, wherein the system grade of service is based, at least in part, on a wireless communication resource availability profile.

6. The method of claim 5, step (e) further comprising the step of allocating the second number of wireless communication resources, wherein the second number of wireless communication resources is greater than the first number of wireless communication resources when the predicted completion time for the message is greater than a first predetermined threshold and the wireless communication resource availability profile indicates that the second number of wireless communication resources is available.

7. The method of claim 5, step (e) further comprising the step of allocating the second number of wireless communication resources, wherein the second number of wireless communication resources is less than the first number of wireless communication resources when the predicted completion time for the message is less than a first predetermined threshold.

8. The method of claim 5, step (e) further comprising the step of allocating the second number of wireless communication resources based on a priority message indication.

9. The method of claim 1, step (d) further comprising the step of monitoring transmission of the portions of the message to determine the system grade of service, wherein the system grade of service is based, at least in part, on an average message delay.

10. The method of claim 9, step (e) further comprising the step of allocating the second number of wireless communication resources, wherein the second number of wireless communication resources is less than the first number of wireless communication resources when the average message delay is greater than a second predetermined threshold.

11. The method of claim 1, further comprising the step of:

f) responsive to the allocating of the second number of wireless communication resources, transmitting, by the communication unit, portions of the message via the second number of wireless communication resources.

12. In a TDM wireless communication system that includes a plurality of communication units, a plurality of wireless communication resources, and a central controller that allocates the plurality of wireless communication resources amongst the plurality of communication units, a method for dynamically allocating the plurality of wireless communication resources, the method comprising the steps of:

a) requesting, by a communication unit of the plurality of communication units, a first number of wireless communication resources of the plurality of wireless communication resources for transmission of a message;

b) when the first number of wireless communication resources are available, allocating, by the central controller, the first number of wireless communication resources to the communication unit;

c) responsive to allocation of the first number of wireless communication resources, transmitting, by the communication unit, portions of the message via the first number of wireless communication resources;

d) while transmitting the message, requesting, by the communication unit, a second number of wireless communication resources of the plurality of wireless communication resources, wherein the second number of wireless communication resources is greater than the first number of wireless communication resources; and e) when the second number of wireless communication resources are available, allocating, by the central controller, the second number of wireless communication resources to the communication unit.

13. The method of claim 12, further comprising the step of:

f) responsive to allocation of the second number of wireless communication resources, transmitting, by the communication unit, portions of the message and portions of an additional message via the second number of wireless communication resources.

14. In a TDM wireless communication system that includes a plurality of communication units, a plurality of wireless communication resources, and a central controller that allocates the plurality of wireless communication resources among the plurality of communication units, a method for the central controller to dynamically allocate the plurality of wireless communication resources, the method comprising the steps of:

a) receiving, from a communication unit of the plurality of communication units, a request for a first number of wireless communication resources of the plurality of wireless communication resources for transmission of a message;

b) when the first number of wireless communication resources are available, allocating the first number of wireless communication resources to the communication unit;

c) monitoring transmission of portions of the message to determine a system grade of service; and d) allocating a second number of wireless communication resources of the plurality of wireless communication resources to the communication unit based on the system grade of service.

15. The method of claim 14, step (b) further comprising the step of allocating the first number of wireless communication resources, wherein the first number of wireless communication resources comprises a first number of time slots on a radio frequency carrier.

16. The method of claim 15, step (d) further comprising the step of allocating the second number of wireless communication resources, wherein the second number of wireless communication resources comprises a second number of time slots on the radio frequency carrier.

17. The method of claim 14, step (c) further comprising the step of monitoring transmission of the portions of the message to determine the system grade of service, wherein the system grade of service is based, at least in part, on a predicted completion time for the message.

18. The method of claim 17, step (c) further comprising the step of monitoring transmission of the portions of the message to determine the system grade of service, wherein the system grade of service is based, at least in part, on a wireless communication resource availability profile.

19. The method of claim 18, step (d) further comprising the step of allocating the second number of wireless communication resources, wherein the second number of wireless communication resources is greater than the first number of wireless communication resources when the predicted completion time for the message is greater than a first predetermined threshold and the wireless communication resource availability profile indicates that the second number of wireless communication resources is available.

20. The method of claim 18, step (d) further comprising the step of allocating the second number of wireless communication resources, wherein the second number of wireless communication resources is less than the first number of wireless communication resources when the predicted completion time for the message is less than a first predetermined threshold.

21. The method of claim 18, step (d) further comprising the step of allocating the second number of wireless communication resources based on a message priority indication.

22. The method of claim 14, step (c) further comprising the step of monitoring transmission of the portions of the message to determine the system grade of service, wherein the system grade of service is based, at least in part, on an average message delay.

23. The method of claim 22, step (d) further comprising the step of allocating the second number of wireless communication resources, wherein the second number of wireless communication resources is less than the first number of wireless communication resources when the average message delay is greater than a second predetermined threshold.

24. In a TDM wireless communication system that includes a plurality of communication units, a plurality of wireless communication resources, and a central controller that allocates the plurality of wireless communication resources among the plurality of communication units, a method for the central controller to dynamically allocate the plurality of wireless communication resources, the method comprising the steps of:

a) receiving, from a communication unit of the plurality of communication units, a request for a first number of wireless communication resources of the plurality of wireless communication resources for transmission of a message;

b) when the first number of wireless communication resources are available, allocating the first number of wireless communication resources to the communication unit;

c) during transmission of the message, receiving, from the communication unit, a request for a second number of wireless communication resources of the plurality of wireless communication resources; and d) when the second number of wireless communication resources are available, allocating the second number of wireless communication resources to the communication unit.

* * * * *